(12) United States Patent
Hattori et al.

(10) Patent No.: US 7,388,321 B2
(45) Date of Patent: Jun. 17, 2008

(54) PIEZOELECTRIC BODY, ELECTRIC GENERATOR AND POLYMER ACTUATOR

(75) Inventors: Tatsuya Hattori, Saitama-ken (JP); Pu Qian, Saitama-ken (JP)

(73) Assignee: Honda Motor Co., Ltd., Tokyo (JP)

( * ) Notice: Subject to any disclaimer, the term of this patent is extended or adjusted under 35 U.S.C. 154(b) by 2 days.

(21) Appl. No.: 10/587,340

(22) PCT Filed: Jan. 26, 2005

(86) PCT No.: PCT/JP2005/000981

§ 371 (c)(1),
(2), (4) Date: Jul. 25, 2006

(87) PCT Pub. No.: WO2005/071826

PCT Pub. Date: Apr. 8, 2005

(65) Prior Publication Data

US 2007/0152543 A1 Jul. 5, 2007

(30) Foreign Application Priority Data

Jan. 26, 2004 (JP) ............................. 2004-017533

(51) Int. Cl.
*H01L 41/09* (2006.01)
*H02N 11/00* (2006.01)
(52) U.S. Cl. ..................................... 310/800; 310/339
(58) Field of Classification Search ............. 310/311, 310/358, 339, 800
See application file for complete search history.

(56) References Cited

U.S. PATENT DOCUMENTS

| | | | | |
|---|---|---|---|---|
| 5,250,167 A | * | 10/1993 | Adolf et al. | 310/309 |
| 5,556,700 A | * | 9/1996 | Kaneto et al. | 252/500 |
| 5,861,704 A | | 1/1999 | Kitami et al. | |
| 6,117,296 A | * | 9/2000 | Thomson | 204/607 |
| 6,249,076 B1 | * | 6/2001 | Madden et al. | 310/363 |
| 2005/0006989 A1 | | 1/2005 | Wallace et al. | |

FOREIGN PATENT DOCUMENTS

JP 08-036917 2/1996

(Continued)

OTHER PUBLICATIONS

Nakdoi et a. Control of Combined IPMC Actuator with 2 Variously Doped Films: experimental Evaluation, Oct. 16, 2007, IEEE International Conference on Control Applications, pp. 1589-1594.*
Della Santa, A. et al., "Performance and work capacity of a polypyrrole conducting polymer linear actuator," *Synthetic Metals*, vol. 90:93-100 (1997).
Okamoto, Tetsuya et al., "Actuator based on doping/undoping-induced volume change in anisotropic polypyrrole film," *Thin Solid Films*, vol. 393:383-387 (2001).
European Search Report for Application No. 05704118.8—2102, dated Jun. 27, 2007.

*Primary Examiner*—J. San Martin
(74) *Attorney, Agent, or Firm*—Lahive & Cockfield, LLP; Anthony A. Laurentano, Esq.

(57) ABSTRACT

A piezoelectric body comprising a powder compact 1 formed from conductive powder comprising a conductive polymer and a dopant, and an ion donor 2, to generate an electromotive force by stress change, and an electric generator or a polymer actuator comprising the piezoelectric body.

11 Claims, 18 Drawing Sheets

FOREIGN PATENT DOCUMENTS

| | | |
|---|---|---|
| JP | 09-302246 | 11/1997 |
| JP | 09-321363 | 12/1997 |
| JP | 2001-294642 | 10/2001 |
| JP | 2003-152234 | 5/2003 |
| JP | 2004-254497 | 9/2004 |
| WO | WO-02/063073 A1 | 8/2002 |
| WO | WO-03/043541 A1 | 5/2003 |

* cited by examiner

PIEZOELECTRIC BODY, ELECTRIC GENERATOR AND POLYMER ACTUATOR

RELATED APPLICATIONS

This application is a 35 U.S.C. 371 national stage filing of International Application No. PCT/JP2005/000981, filed 26 Jan. 2005, which claims priority to Japanese Patent Application No. 2004-017533 filed on 26 Jan. 2004 in Japan. The contents of the aforementioned applications are hereby incorporated by reference.

FIELD OF THE INVENTION

The present invention relates to a piezoelectric body which generates an electromotive force by stress change and is able to be utilized as a pressure sensor, a displacement sensor, an acceleration sensor, an apparatus generating and/or recovering energy, etc., and an electric generator and a polymer actuator comprising such a piezoelectric body.

BACKGROUND OF THE INVENTION

In the fields using electromagnetic motors such as robots, cutting machines, automobiles, etc., demand has been mounting to reduce the weight of driving systems. However, because the power densities of the electromagnetic motors depend on the weight of motors, the weight reduction of actuators utilizing the electromagnetic motors is limited. To obtain large power with reduced size and weight, actuators without using electromagnetic motors are desired.

As actuators, which can be made smaller in size and weight, polymer actuators have recently been attracting much attention. Known as the polymer actuators are a gel actuator using a conductive polymer gel, a polymer membrane actuator using a conductive polymer membrane, etc.

An example of the conductive polymer membrane actuator may be a conductive polymer membrane and metal electrodes attached to their surfaces. The metal electrodes are formed on the conductive polymer membrane by such methods as chemical plating, electroplating, vapor deposition, sputtering, coating, pressure-bonding, welding, etc. When potential difference is provided to an assembly of a conductive polymer membrane and metal electrodes in a water-containing state, the conductive polymer membrane bends and deforms, and the assembly can be utilized as a driving force.

A phenomenon generating stress such as strain, etc. by applying voltage, like an actuator, is called "negative piezoelectric effect," and a phenomenon generating voltage by applying stress such as pressure, tension, etc., is called "positive piezoelectric effect." It is known that the piezoelectric body showing a negative piezoelectric effect also shows a positive piezoelectric effect. It is considered that a combination of negative and positive piezoelectric actuators is efficiently driven. For example, when voltage is applied to one actuator, it turns the electric energy to movement, which is transmitted to the other actuator. Part of the transmitted kinetic energy can be recovered as electric energy by the other actuator. Such an actuator utilizing both positive and negative piezoelectric effects is very efficient.

JP8-36917A describes a piezoelectric element produced by stretching a ferroelectric copolymer film of trifluoroethylene and vinylidene fluoride, and pauling the resultant ferroelectric, single-crystal film with a paraelectric or hexagonal phase while keeping the surface of the stretched film substantially free. When voltage is applied to this piezoelectric film with metal electrodes bonded to both sides in a water-containing state, the piezoelectric film extends or contracts on one side, so that it curves as a polymer film actuator. However, it is difficult to control the displacement amount and position of a bending actuator. In the case of the positive piezoelectric effect, it is difficult to control electric energy by the displacement amount and position. In addition, this actuator is not efficient because of failing to obtain high electric energy corresponding to the stress applied.

JP2001-294642A describes a polyurethane elastomer-based actuator produced from polyisocyanate and at least one selected from the group consisting of polyols having amide groups and polyols comprising amide-group-containing polymers. When an electric field is applied to the polyurethane elastomer-based actuator in a state where it contains 0.01-50% by weight of moisture, the polyurethane elastomer exhibits amplified strain in an electric field direction. It also describes that when voltage is applied to a 2-mm-thick polyurethane elastomer sheet sandwiched by electrodes and containing water, the sheet undergoes thickness change by strain. However, this polyurethane elastomer-based actuator is inefficient because it utilizes small thickness change as displacement. On the other hand, when the positive piezoelectric effect is to be used, it is difficult to achieve efficiently controllable energy conversion, because very small displacement should be used to generate electric energy, resulting in the likelihood that too large a force is applied to the sheet.

As discussed above, although piezoelectric polymers constituting actuators generate electric energy by stress change, the conventional polymer actuators mostly in the form of films are not suited to generate electric power by stress change. Polymer actuators capable of using the positive piezoelectric effect effectively have not been known yet.

OBJECTS OF THE INVENTION

Accordingly, an object of the present invention is to provide a piezoelectric body which generates an electromotive force by stress change and displaces by an applied voltage, an electric generator comprising the piezoelectric body, and an actuator generating a large displacement and power and usable for both positive and negative piezoelectric effects with easily controllable displacement.

DISCLOSURE OF THE INVENTION

As a result of intense research in view of the above object, the inventors have found that a piezoelectric body comprising a conductive powder compact comprising a conductive polymer and a dopant, and an ion donor, generates an electromotive force by stress change, and that its negative piezoelectric effect can also be utilized. The present invention has been completed based on such finding.

Thus, the piezoelectric body of the present invention comprises a conductive powder compact comprising a conductive polymer and a dopant, and an ion donor, whereby an electromotive force is generated by stress change.

The conductive polymer preferably has a conjugated structure, and is more preferably at least one selected from the group consisting of polypyrrole, polythiophene, polyaniline, polyacetylene and their derivatives. The ion donor is preferably in the form of a solution, a sol, a gel or a combination thereof, and that the ion donor functions as a binder. The ion donor preferably contains an amphiphatic compound.

The conductive polymer occupies preferably 1-99.9% by mass of the conductive powder, the conductive polymer preferably has an average particle size of 10 nm to 1 mm. The conductive powder preferably has electric resistance of $10^{-7}$ Ω to 1 MΩ.

The electric generator of the present invention comprises the piezoelectric body comprising a powder compact and an ion donor, and a means for changing stress applied to the powder compact, the ion donor being released from and/or absorbed by the powder compact by compressing and/or extending the powder compact with the stress-changing means so as to generate the electromotive force.

The polymer actuator of the present invention comprises the piezoelectric body of the present invention, a work electrode, and a counter electrode, the work electrode being in contact with the powder compact, the counter electrode being disposed at a position separate from the powder compact in the ion donor, and the powder compact contracting or extending when voltage is applied between the work electrode and the counter electrode.

One preferable example of the polymer actuator comprises plural powder compacts arranged in tandem in the ion donor.

The energy-generating/recovering system of the present invention comprises at least a pair of the above polymer actuators, the contraction or extension of one powder compact being transmitted to the other powder compact to change its stress, so that the other powder compact generates an electromotive force.

BRIEF DESCRIPTION OF THE DRAWINGS

FIG. 1(*b*) is a cross-sectional view taken along the line A-A in FIG. 1(*a*).

FIG. 2(*b*) is a schematic view showing an electric generator of the present invention, in which the powder compact is compressed.

FIG. 4(*b*) is a cross-sectional view taken along the line B-B in FIG. 4(*a*).

FIG. 5(*b*) is a schematic view showing a polymer actuator, in which the powder compact is extended by the supply of electric current.

FIG. 5(*c*) is a schematic view showing a polymer actuator, in which the powder compact is contracted by the supply of electric current.

DESCRIPTION OF THE PREFERRED EMBODIMENTS

[1] Piezoelectric Body

Figure 1A:
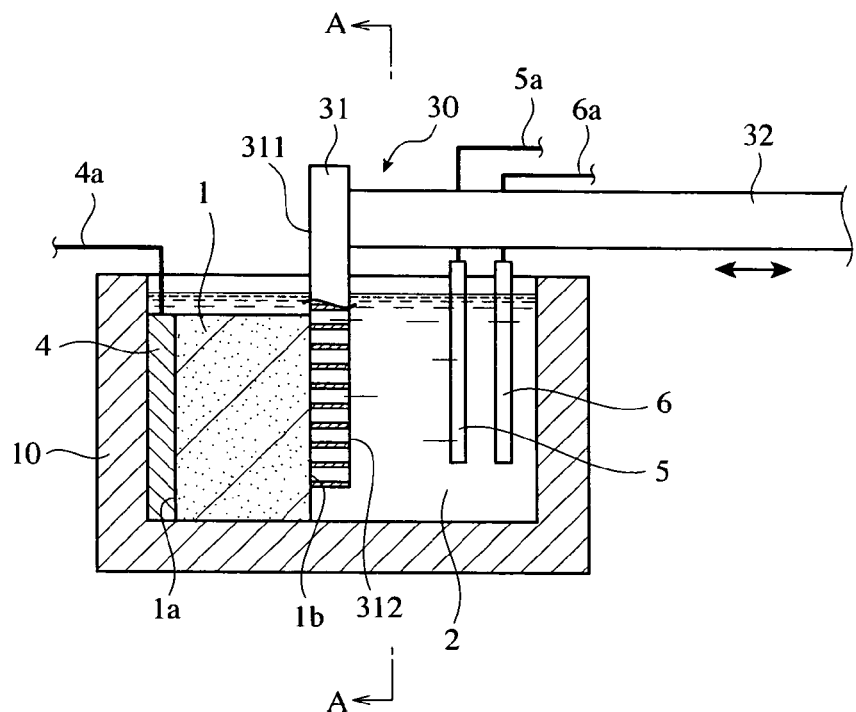
FIG. 1(*a*) is a vertical cross-sectional view showing one example of the electric generator comprising one example of the piezoelectric body of the present invention.

The piezoelectric body of the present invention comprises a conductive powder compact comprising a conductive powder, and an ion donor. The powder compact is porous and impregnated with the ion donor.

(1) Conductive Powder

The conductive powder comprises a conductive polymer and a dopant. The conductive polymer preferably has a conjugated structure. The conductive polymer having a conjugated structure is more preferably at least one selected from the group consisting of polypyrrole, polythiophene, polyaniline, polyacetylene and their derivatives, particularly polypyrrole.

A usual dopant, p-type or n-type, may be used. Examples of the p-type dopants include halogens such as $Cl_2$, $Br_2$, $I_2$, ICl, $ICl_3$, IBr, $IF_3$, etc., Lewis acids such as $PF_5$, $PF_6$, $BF_4$, $AsF_5$, $SbF_5$, etc., inorganic acids such as sulfuric acid, nitric acid, perchloric acid, etc., organic acids such as p-toluene sulfonic acid, etc. and transition metal salt such as iron trichloride, iron tetrachloride, titanium tetrachloride, iron sulfate, iron nitrate, iron perchlorate, iron phosphate, iron sulfate, iron bromide, iron hydroxide, copper nitrate, copper sulfate, copper chloride, etc. Examples of the n-type dopants include alkali metals such as Li, Na, K, Rb, Cs, etc., and alkaline earth metals such as Be, Mg, Ca, Sc, Ba, Ag, Eu, Yb, etc.

The amount of the conductive polymer in the conductive powder is preferably 1-99.9% by mass, more preferably 30-70% by mass. When the conductive polymer is less than 1% by mass, the contraction of the powder compact comprising the conductive polymer is too small, resulting in generating too small electromotive force. When the conductive polymer is more than 99.9% by mass, the content of a dopant and an oxidation polymerization catalyst hereinafter described is too small, resulting in too small conductivity thereof The conductive polymer has an average particle size of 10 nm to 1 mm. When it has an average particle size of more than 1 mm, the powder compact comprising the conductive powder is difficult to be formed. The conductive polymer having an average particle size of less than 10 nm cannot easily be produced and handled.

The conductive powder preferably comprises a conductive material such as carbon and metals other than alkali metals and alkaline earth metals. The conductive powder comprising conductive material exhibits excellent conductivity. The metals other than alkali metals and alkaline earth metals are preferably iron, copper, nickel, titanium, zinc, chromium, aluminum, cobalt, gold, platinum, silver, manganese, tungsten, palladium, ruthenium, and zirconium.

The production method of the conductive powder will be explained below, taking a conductive powder comprising a conductive polymer, a dopant and an oxidation polymerization catalyst for example. The conductive polymer can efficiently be synthesized by oxidation polymerization. When a monomer is dropped into an aqueous solution containing a dopant and an oxidation polymerization catalyst and stirred, the monomer is polymerized with the dopant and the oxidation polymerization catalyst taken there into. The polymerization of the monomer in solution containing the dopant and the oxidation catalyst provides a conductive polymer powders comprising them. The conductive powders comprising a conductive material can be produced only to add the conductive material, in addition to a dopant and an oxidation polymerization catalyst, to the solution for polymerization of the monomer.

Because the transition metal salt such as copper chloride, iron trichloride, etc., also functions as an oxidation polymerization catalyst, in case these transition metal salt is used as a dopant, another oxidation polymerization catalyst is not required except for the dopant. Accordingly, when the monomers are dropped into an aqueous solution containing a transition metal salt and stirred, the monomers enough polymerize, resulting in conductive powders comprising the conductive polymer and the transition metal salt. On the other hand, in case where other dopant is used, an oxidation polymerization catalyst is required. The oxidation polymerization catalyst is preferably dissolved in the aqueous solution, such that catalyst/monomer ratio is about 10/1 to 1/100. When the molar ratio is less than 1/100, efficient catalytic effect cannot be obtained. When the molar ratio is more than 10/1, the catalytic effect is not increased, and the surplus of the catalyst is useless.

(2) Powder Compact

The powder compact is a porous body formed with conductive powders. The powder compact is preferably in a planar shape. The powder compact is preferably as thick as 0.1 mm or more. When it is thinner than 0.1 mm, it is easily broken, resulting in difficulty in handling. Though the upper limit of the thickness of the powder compact is not particularly limited, the practical upper limit of the powder compact is about 20 mm.

The powder compact can be produced by compressing conductive powders, for instance, by charging the conductive powder into a tablet mold, evacuating the mold, and compressing it at 700-900 MPa for about 3-10 minutes. With the conductive powder compacted, an electromotive force can be generated when the conductive powder soaked in the ion donor is compressed. The conductive powder preferably has electric resistance of $10^{-7}$ Ω to 1 MΩ, more preferably has $10^{-4}$ Ω to 1 MΩ. The electric resistance of the conductive powder used herein is a value measured by a four-terminal method with electrode intervals of 1.5 mm. When the electric resistance is more than 1 MΩ, the conductive powder has too low conductivity, resulting in poor oxidation-reduction reaction thereof The conductive powder having electric resistance of less than $10^{-7}$ Ω cannot easily be produced.

Though the conductive polymer comprised in powder compact may be in an oxidized, neutral or reduced state, the reduced state is preferable. The reduced conductive polymer generates large electromotive force, when stress changes. To reduce the conductive polymer, the powder compact connected to a platinum wire, etc. as a lead is soaked in an electrolytic solution such as an aqueous $NaPF_6$ solution, etc. and voltage is applied such that the powder compact acts as an anode. The counter electrode and the reference electrode need to be soaked in the electrolytic solution. Preferable voltage and conduction time vary depending on the thickness of the powder compact, the particle size of the conductive powder, the types of the conductive polymer and the dopant, etc. The voltage may be $-3$ V to $-0.1$ V, and the conduction time may be 0.5-1.5 hours in general. In the case of a powder compact as thick as about 1 cm, for example, the powder compact of a reduced conductive polymer can be obtained by applying voltage of $-1.5$ V to $-0.1$ V for about 1 hour.

(3) Ion Donor

The ion donor contains an electrolyte and/or a polymer. Examples of the electrolytes include sodium chloride, $NaPF_6$, p-toluene sulfonate and sodium perchlorate. Examples of the polymer include polyethyleneglycol, polyacrylic acid, etc. Because polyethyleneglycol and polyacrylic acid are amphiphatic, the ion donor containing thereof is easy to enter the pores of the powder compact. Electrolyte and/or polymer also preferably functions as a binder of the powder compact.

Because the ion donor moves in and out of the powder compact, it should have such flowability. The ion donor is preferably in the form of a solution, a sol, a gel, a combination of a solution and a sol, a combination of a sol and a gel, a combination of a solution and a gel or a combination of a solution, a sol and a gel. A solvent and/or a dispersing medium for the ion donor is preferably water. When the solvent and/or the dispersing medium are water, the ion donor has large conductivity. The concentration of an aqueous electrolyte solution is preferably about 0.01-5 mol/L.

(4) Electromotive Force

When a stress change of $10^{-5}$-10 MPa occurs in the powder compact, the piezoelectric body generates an electromotive force. The magnitude of the electromotive force generated from the piezoelectric body by the stress change varies depending on the compositions of the conductive powder and/or the ion donor, the composition of the conductive powder, the thickness of the powder compact, the rate of the stress change, etc. For example, when the powder compact as thick as 0.1-20 mm comprising polypyrrole as a conductive powder and having an average particle size of 10 nm to 1 mm is soaked in an aqueous sodium chloride solution at a concentration of 0.01-5 mol/L, the self-potential changes from a range of $-0.29$ V to $-0.27$ V to a range of $-0.27$ V to $-0.25$ V by stress change.

[2] Electric Generator

Figure 1B:
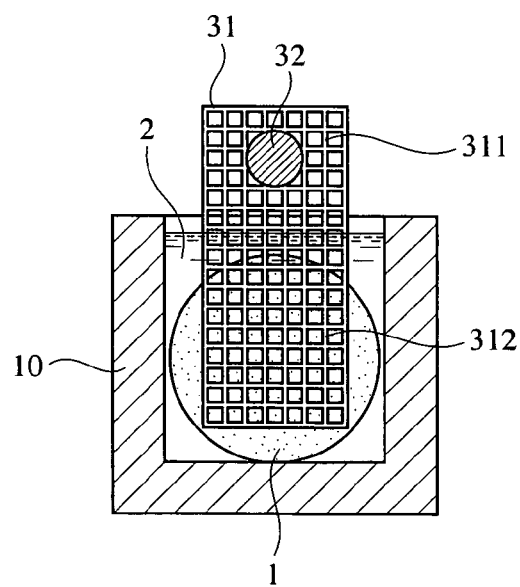
Figure 2:
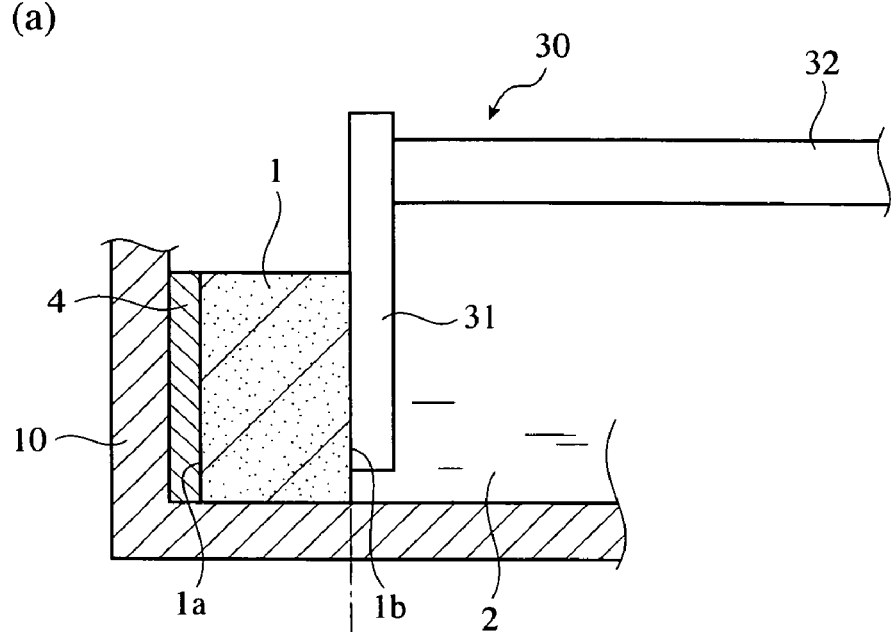
FIG. 2(*a*) is a schematic view showing an electric generator of the present invention, in which no stress is applied to the powder compact.
Figure 2:
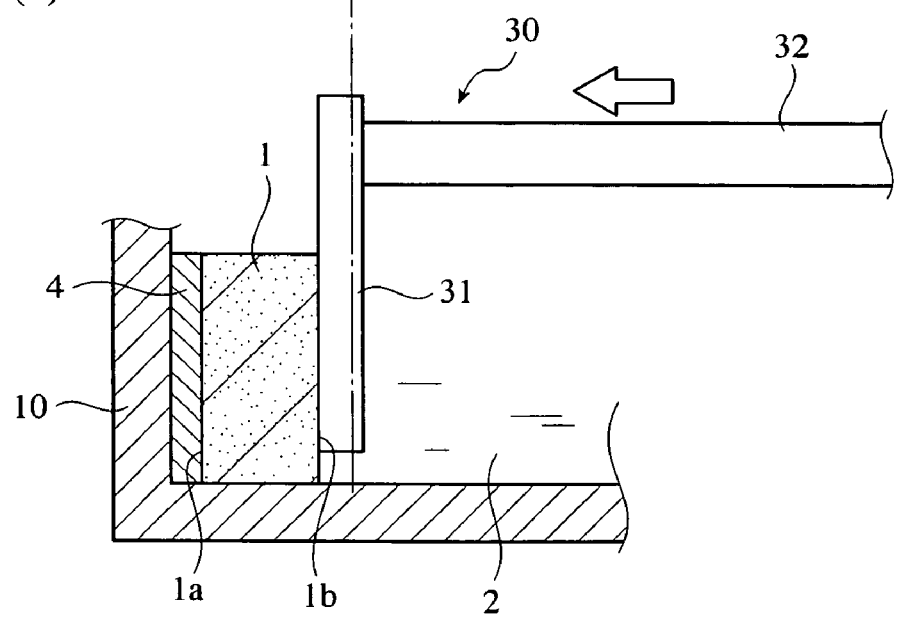

FIGS. 1 and 2 show one example of the electric generator having a piezoelectric body according to the present invention. As shown in FIG. 1($a$), the electric generator comprises a cell 10 containing a piezoelectric body comprising a powder compact 1 and an ion donor 2, a work electrode 4 connected to a fixed end 1$a$ of the powder compact 1, a movable member 30 connected to a driving end 1$b$ of the powder compact 1, a counter electrode 5 and a reference electrode 6 soaked in the ion donor 2.

A box-shaped cell 10 contains the powder compact 1 vertically. The cell 10 has a slightly larger inner width than the width of the powder compact 1, so that the powder compact 1 can extend or contract in the cell 10. The cell 10 is filled with a liquid ion donor 2.

The work electrode 4 is put between fixed end 1$a$ of the powder compact 1 and an inner face of the cell 10. The work electrode 4 is preferably bonded to the inner face of the cell 10. With the work electrode 4 having one surface bonded to the powder compact 1 and the other surface bonded to the inner surface of the cell 10, electric power can be generated not only by compressing the powder compact 1, but also by pulling it. The work electrode 4 can be bonded to the cell 10 by an adhesive. The work electrode 4 is preferably made of platinum, gold, silver, copper, nickel, stainless steel or carbon. The work electrode 2 is preferably as thick as 0.1 μm to 10 mm. The work electrode 4 can be formed on the powder compact 1 by chemical plating, electroplating, vapor deposition, sputtering, coating, pressure-bonding, welding, etc. The work electrode 4 is connected to a lead 4a.

The movable member 30 comprises a movable plate 31 and a movable rod 32 perpendicularly fixed to the movable plate 31. A lower portion 312 of the movable plate 31 is connected to the driving end 1b of the powder compact 1, and an upper portion 311 of the movable plate 31 is protruded from the cell 10. Though the movable plate 31 is a net in the embodiment shown in FIGS. 1 and 2, the shape of the movable plate 31 is not particularly limited as long as (a) it does not prevent the powder compact 1 from absorbing and desorbing the ion donor 2, and (b) it can transmit the displacement of the movable rod 32 powder to the compact 1. For example, the movable plate 31 may be a porous body, or a combination of a porous body and a net. The movable rod 32 is horizontally supported to permit the compression and/or extension of the powder compact 1.

The counter electrode 5 and the reference electrode 6 are connected to a lead 5a and a lead 6a, respectively. Known materials may be used for the counter electrode 5 and the reference electrode 6. Preferable materials for the electrodes are platinum, gold, silver, copper, nickel, stainless steel, carbon, etc.

When the movable rod 32 pushes the powder compact 1, the powder compact 1 generates an electromotive force because of the stress change. This principle is thought as below. When the powder compact 1 is pushed from a stress-free position shown in FIG. 2(a) to a position shown in FIG. 2(b) by the movable rod 32 (leftward in FIGS. 1 and 2), space between the conductive powder in the powder compact 1 becomes smaller, so that the ion donor 2 is released from the powder compact 1. Because the ion donor 2 contains an electrolyte, etc., electric charge is induced on the surface of conductive powder by the movement of the ion donor 2, resulting in generating an electromotive force. After space between the conductive powders becomes so small that the ion donor 2 hardly moves in the powder compact 1, the powder compact 1 is presumably elastically deformed.

On the contrary, in case that the movable rod 32 pulls the powder compact 1, the powder compact 1 also generates an electromotive force. When the movable rod 32 moves away from the powder compact 1 rightward in FIGS. 1(a) and 2, the powder compact 1 is pulled so that space between the conductive powder becomes larger, thereby making it easy for the ion donor 2 to get into the powder compact 1. When the electrolyte approaches the conductive powder, electric charge is induced on the surface of the conductive powder repulsively, resulting in generating an electromotive force in opposite to that generated when the powder compact 1 is pushed. After space between the conductive powders becomes so large that the ion donor 2 hardly moves in the powder compact 1, the powder compact 1 is presumably elastically deformed.

Figure 3:
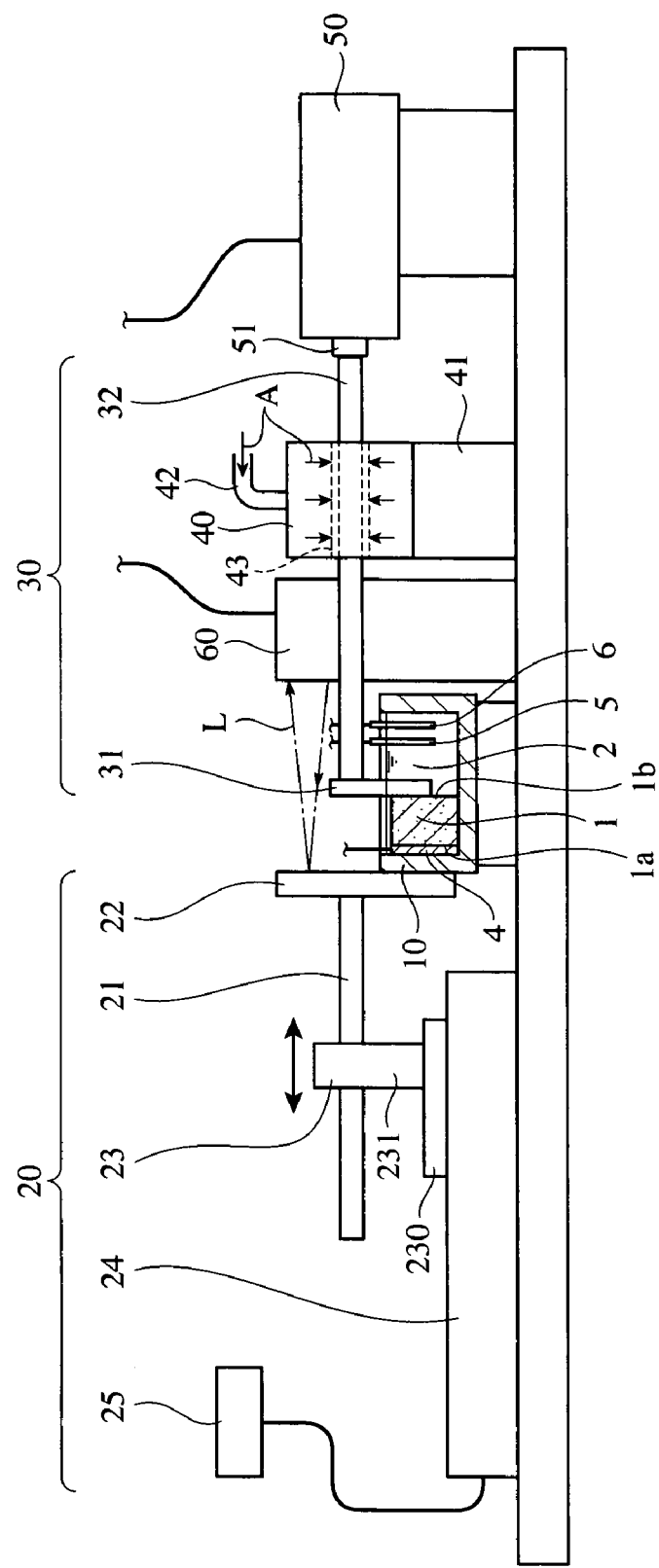
FIG. 3 is a schematic view showing one example of an apparatus for measuring an electromotive force of the piezoelectric body.

The electric generator shown in FIG. 3 can measure the stress, extension and contraction, and electromotive force of the powder compact 1. This apparatus comprises a cell 10 containing a powder compact 1 and an ion donor 2, a driving means 20 fixed to a rear end of the cell, a movable member 30 fixed to a front side of the powder compact 1, an air bearing 40 supporting the movable member 30, a load cell 50 provided on the front side of the movable member 30, a laser displacement sensor 60 facing a driving board 22 of the driving means 20. Like in the example shown in FIGS. 1 and 2, a work electrode 4 is connected to one end 1a of the powder compact 1, with a counter electrode 5 and a reference electrode 6 soaked in the ion donor 2.

The driving means 20 comprises a driving rod 21 and a driving board 22 perpendicularly fixed to the front end of the driving rod 21 to push or pull the cell 10. The rear end of the driving rod 21 is perpendicularly fixed to the stand 23, so that the driving rod 21 extends horizontally. The stand 23 provided on the stage 24 comprises a base 230 and a pillar 231 vertically supported on the base 230. The base 230 is put on a linear rail (not shown) provided on the stage 24, and moves by instructions from the controller 25. The driving rod 21 fixed to the stand 23 also horizontally moves together with the moving stand 23. To push the cell 10, the driving means 20 needs to move toward the load cell 50 (rightward in FIG. 3). The driving board 22 may be in touch with a rear end of the cell 10, or be away from the rear end of the cell 10. In case that the cell 10 is pulled by the driving means 20, the driving board 22 should be bonded to the cell 10.

The movable rod 32 of the movable member 30 is supported by the air bearing 40. When the displacement of the driving rod 21 is transmitted to the movable member 30 via the powder compact 1, the movable rod 32 also moves. The front end of the movable rod 32 is fixed to a load button 51 of the load cell 50, and the load button 51 is in contact with a strain sensor (not shown) in the load cell 50. When the load button 51 is pushed by the movable rod 32, the strain sensor is deformed to detect a load.

The air bearing 40 is fixed to a support 41 such that the movable rod 32 extends horizontally. The air bearing 40 has a pipe 42 for supplying air A. A gap between the air bearing 40 and the movable rod 32 is filled with the air A supplied from the pipe 42, so that the air bearing 40 supports the movable rod 32 with substantially no contact. Thus, the coefficient of kinetic friction of the movable rod 32 is almost zero.

A laser displacement sensor 60 measures the amount of displacement of the driving board 22 by applying a laser beam to the driving board 22. In the example shown in FIG. 3, the laser displacement sensor 60 is provided on the front side of the driving board 22, but the positions of the laser displacement sensor 60 is not limited as long as driving board 22 stays in a detectable range of the laser displacement sensor 60 before and after displacement.

When the stand 23 and the driving rod 21 fixed thereto move toward the load cell 50 (rightward in FIG. 3) by instructions from the controller 25, a pushing force is transmitted to the cell 10 from the driving board 22. In case where the driving board 22 is away from the cell 10 before driving, the driving board 22 touches the cell 10, resulting in pushing the cell 10. Because the powder compact 1 charged in the cell 10 is sandwiched by the cell 10 and the movable member 30, the same force is applied to the powder compact 1 and the cell 10. Because the compressed powder compact 1 generates an electromotive force while slightly contracting, the change of self-potential is detected by the work electrode 4, the counter electrode 5 and the reference electrode 6 soaked in the ion donor 2. A load applied to the powder compact 1 is transmitted to the load cell 50 via the movable member 30, so that changing stress can be detected.

The amount of displacement of the driving board 22 can be detected by the laser displacement sensor 60. When the driving means 20 returns to the original position, the powder compact 1 also returns to the original state while generating an electromotive force in opposite to that obtained by compressing.

In case where the driving rod 21 is moved away from the load cell 50 (leftward in FIG. 3), the cell 10 is pulled by the driving board 22, resulting in the transmitting the force to the powder compact 1 in the cell 10. The pulled powder compact 1 generates an electromotive force while extending slightly. The stress applied to the powder compact 1 can be detected by the load cell 50, and the displacement of the driving board 22 can be detected by the laser displacement sensor 60.

In the examples shown in FIGS. 1 to 3, the powder compact 1 is horizontally compressed and/or extended by the movable member 30, etc., though the electric generator of the present invention is not limited thereto. The powder compact 1 may be perpendicularly compressed and/or extended. In case that the powder compact 1 is perpendicularly compressed and/or extended, the powder compact 1 releases and/or absorbs the ion donor 2, resulting in generating an electromotive force.

[3] Piezoelectric Polymer Actuator

The piezoelectric body extending or contracting by the supply of electric current can be used as a driving body of the polymer actuator.

Figure 4A:
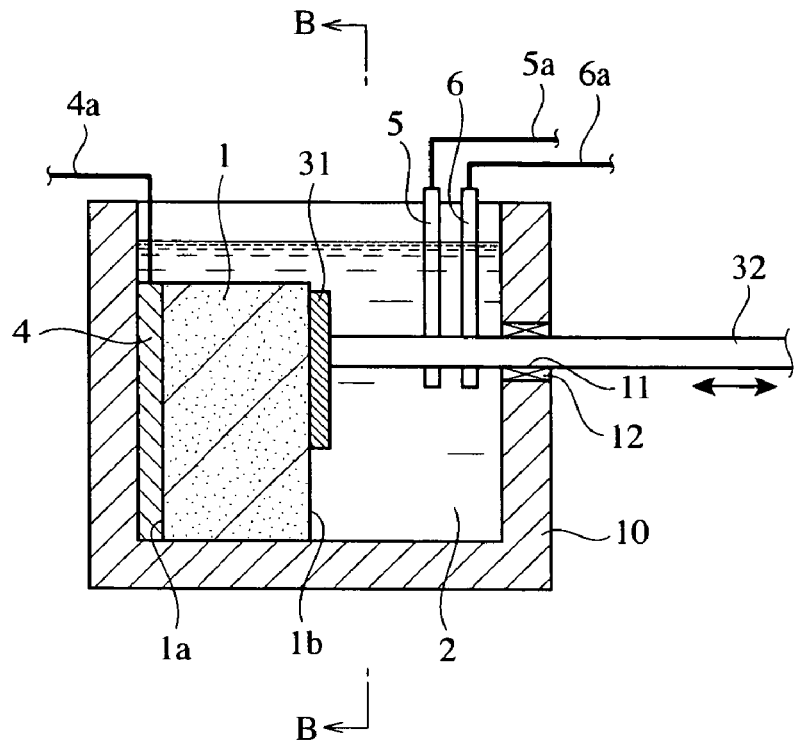
FIG. 4(*a*) is a vertical cross-sectional view showing one example of the polymer actuator of the present invention.
Figure 4B:
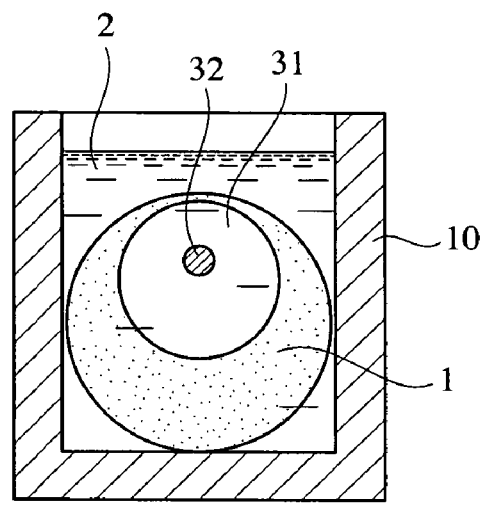

FIG. 4 shows one example of the piezoelectric polymer actuator of the present invention. This actuator is substantially the same as shown in FIGS. 1 and 2, except that the movable rod 32 of the movable member 30 penetrates through the cell 10. Accordingly, only differences will be explained below. As shown in FIG. 4(*b*), the movable plate 31 is in a disc shape, and a movable rod 32 is fixed perpendicularly to the center of the movable plate 31. The movable rod 32 penetrating through an opening 11 of the cell 10 is movably supported by a bearing 12 disposed in the opening 11. The opening 11 is sealed to prevent the leak of the ion donor 2. When the powder compact 1 is driven by the supply of electric current, the movable rod 32 moves. Accordingly, one end of the movable rod 32 acts as a driver.

When voltage is applied between the work electrode 4 and the counter electrode 5 without stress change of the powder compact 1, the powder compact 1 extends or contracts, driving the movable member 30. For example, when voltage is applied at the position shown in FIG. 5(*a*) (no electric current is supplied, such that the work electrode 4 acts as a positive electrode, the powder compact 1 is extended so that the movable member 30 moves rightward in the figure [FIG. 5(*b*)]. When voltage is applied such that the work electrode 4 acts as a negative electrode, the powder compact contracts, so that the movable member 30 moves leftward in the figure [FIG. 5(*c*)]. The displacement of the powder compact 1 appears to occur by the absorption or release of the electrolyte and/or the conductive polymer and water when the conductive polymer of the powder compact 1 is oxidized or reduced by electric current supplied. The behavior of the extension or contraction may vary depending on the types of the conductive polymer, the ion donor, and their compositions. In other words, depending on their compositions, the powder compact 1 extends when electric current is supplied such that the work electrode 4 acts as a positive electrode, and contracts when electric current is supplied such that the work electrode 4 acts as a negative electrode.

On the other hand, when the powder compact 1 is extended or contracted by the movable member 30 in a state where no electric current is supplied between the work electrode 4 and the counter electrode 5, an electromotive force is generated. When two polymer actuators are cooperatively used, part of electric energy used for driving one polymer actuator can be recovered. Specifically, electric current is supplied to one polymer actuator to move the movable member 30 thereof, which moves the movable member 30 of the other with part of its driving force, thereby generating an electromotive force in the other actuator.

Figure 5:
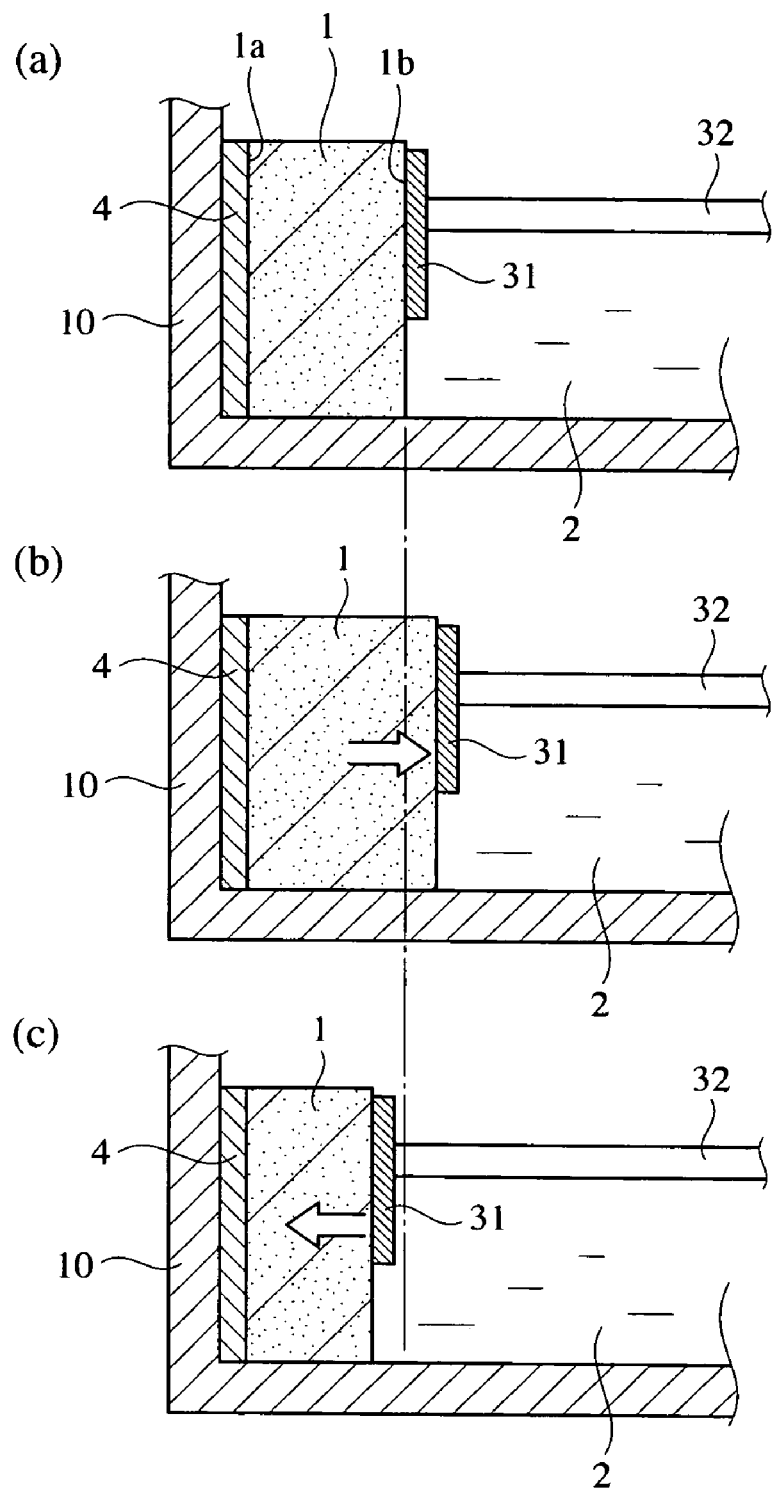
FIG. 5(*a*) is a schematic view showing a polymer actuator, in which no electric current is supplied to the powder compact.
Figure 6:
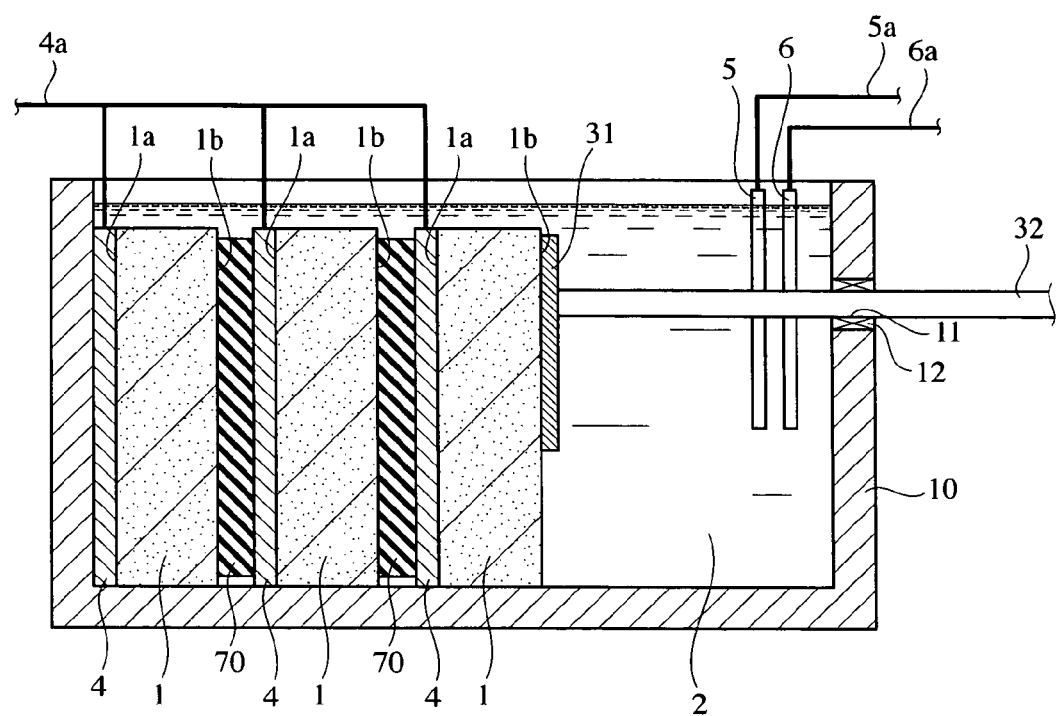
FIG. 6 is a vertical cross-sectional view showing another example of the polymer actuator the present invention.
Figure 7:
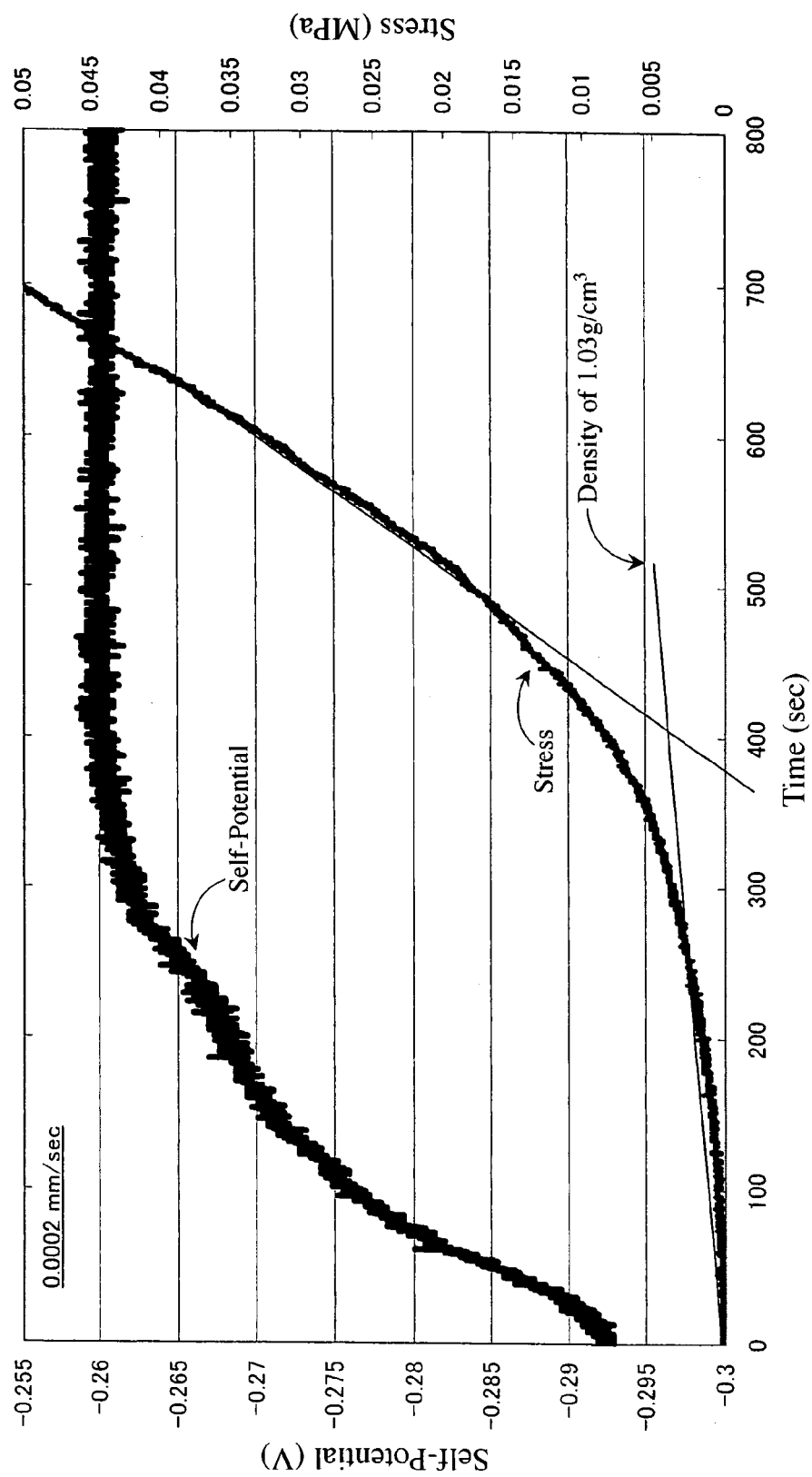
FIG. 7 is a graph showing an electromotive force of the piezoelectric body of Example 1 changing with stress.
Figure 8:
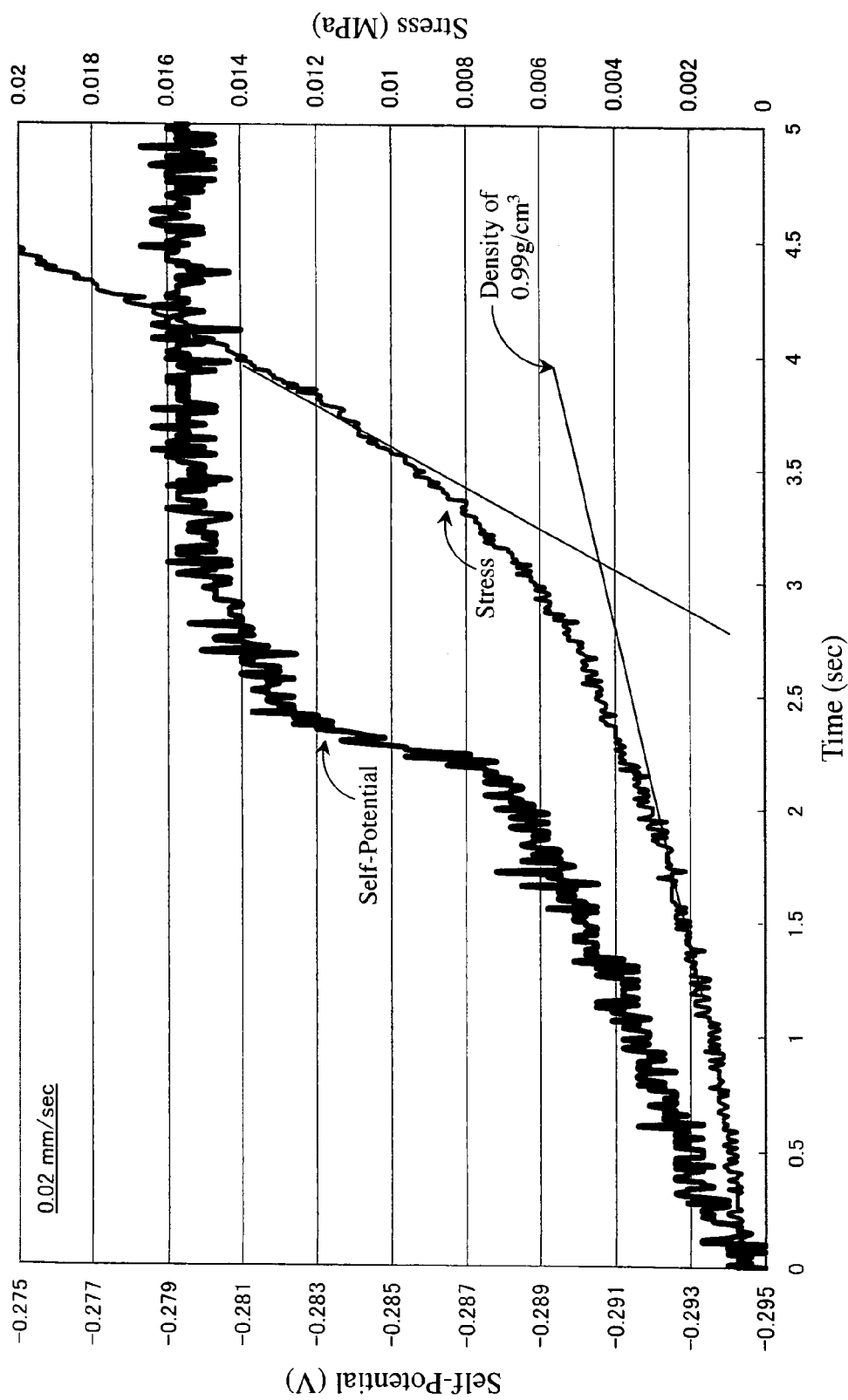
FIG. 8 is a graph showing an electromotive force of the piezoelectric body of Example 1 changing with stress.
Figure 9:
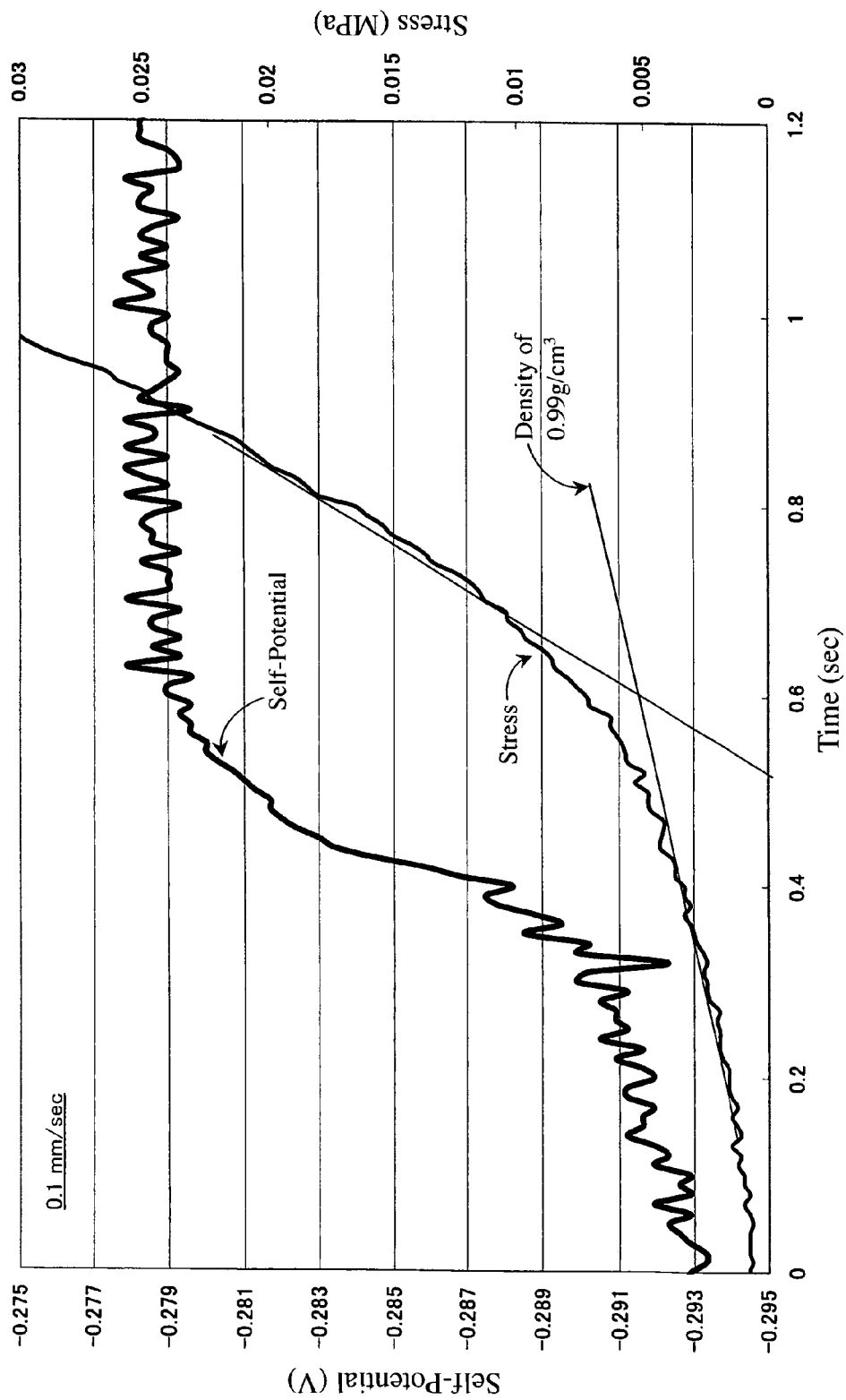
FIG. 9 is a graph showing an electromotive force of the piezoelectric body of Example 1 changing with stress.
Figure 10:
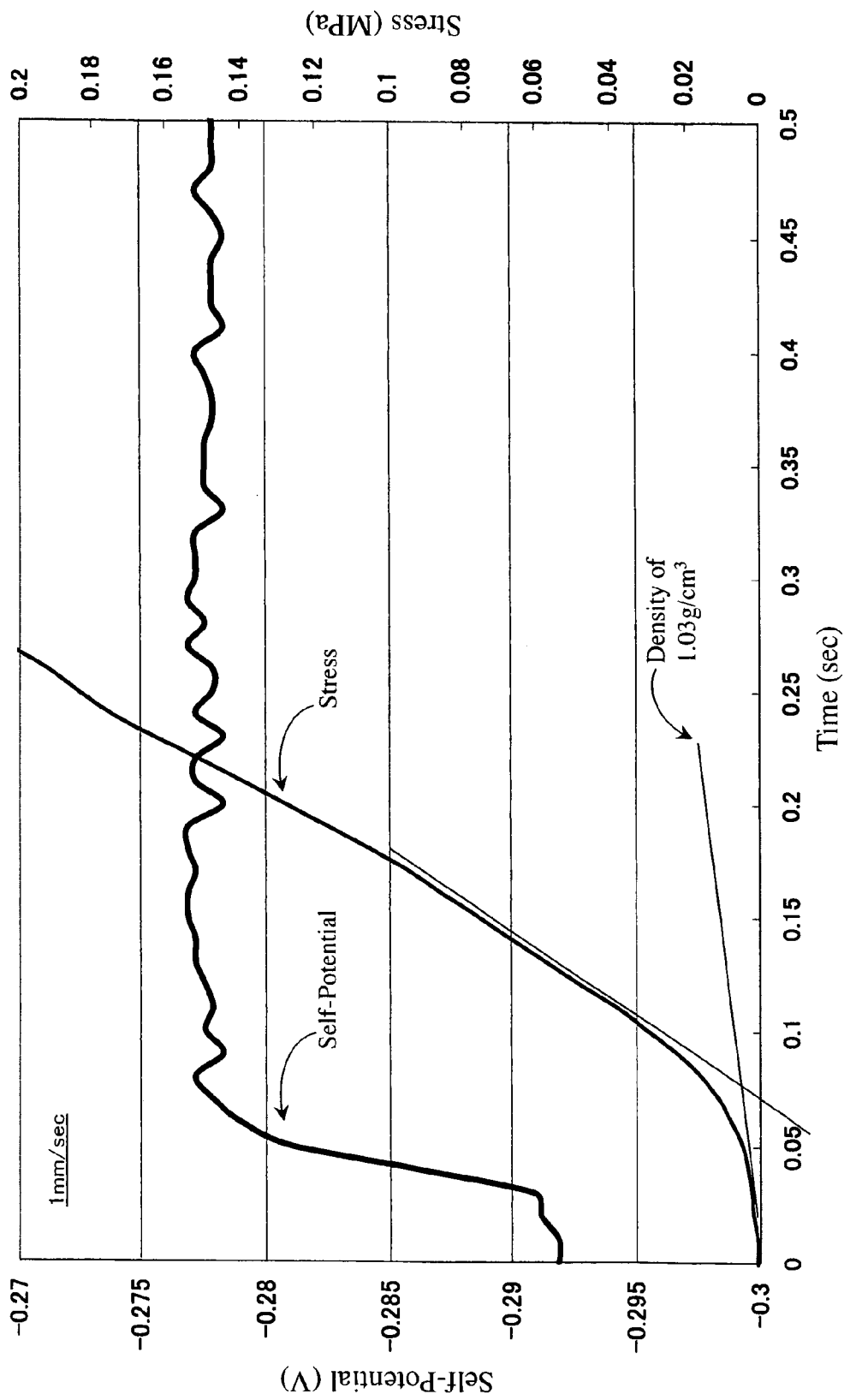
FIG. 10 is a graph showing an electromotive force of the piezoelectric body of Example 1 changing with stress.
Figure 11:
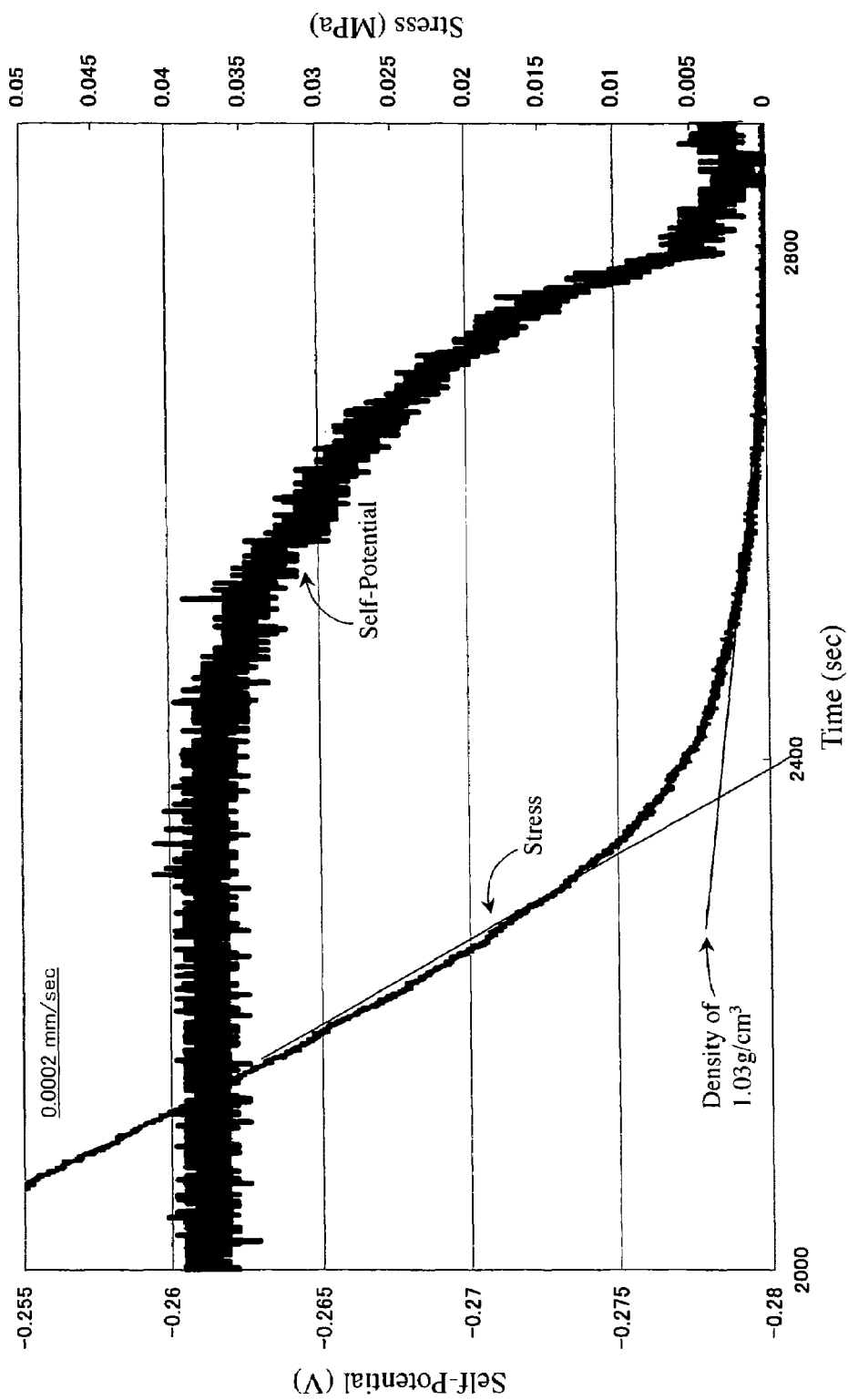
FIG. 11 is a graph showing an electromotive force of the piezoelectric body of Example 1 changing with stress.
Figure 12:
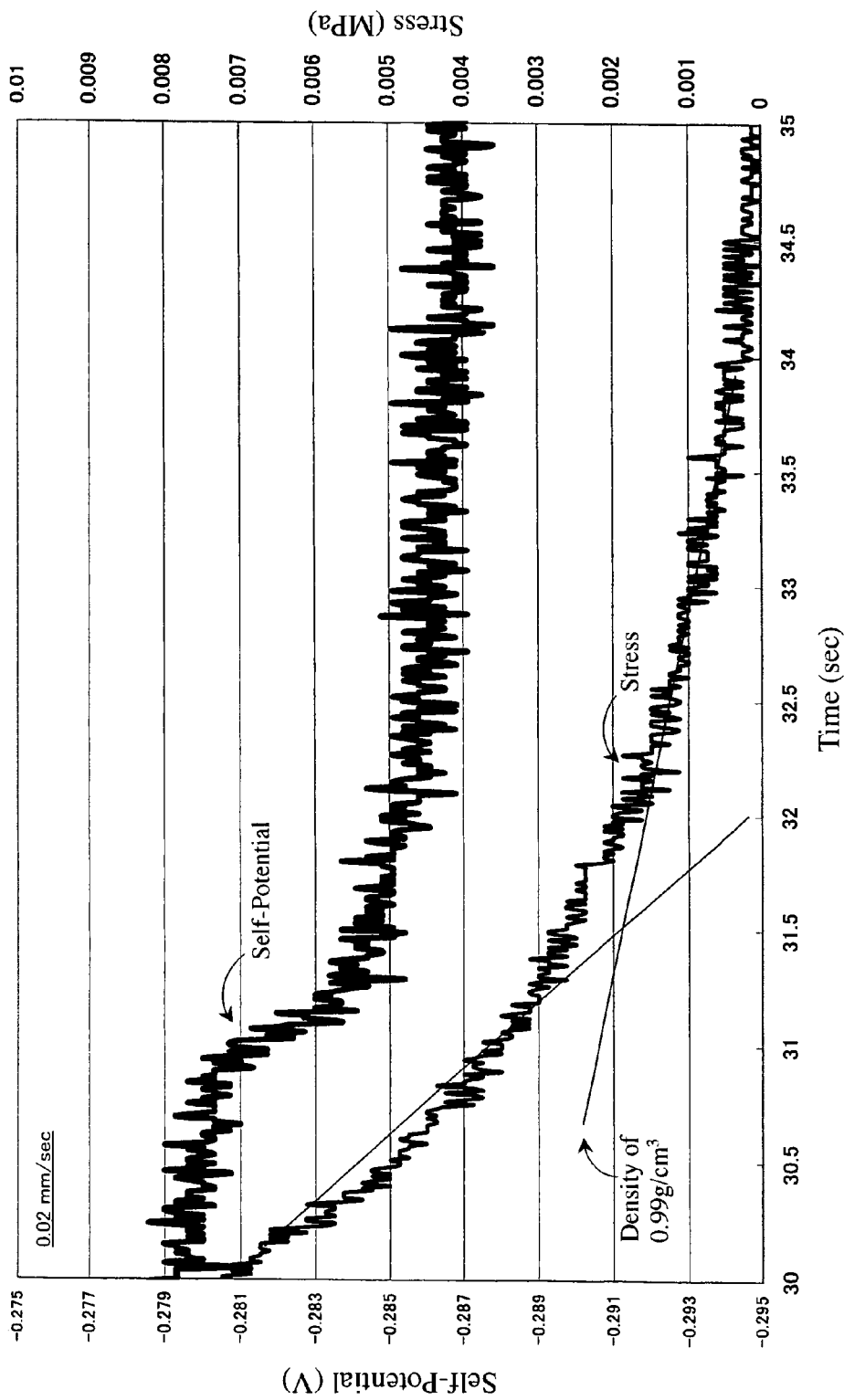
FIG. 12 is a graph showing an electromotive force of the piezoelectric body of Example 1 changing with stress.
Figure 13:
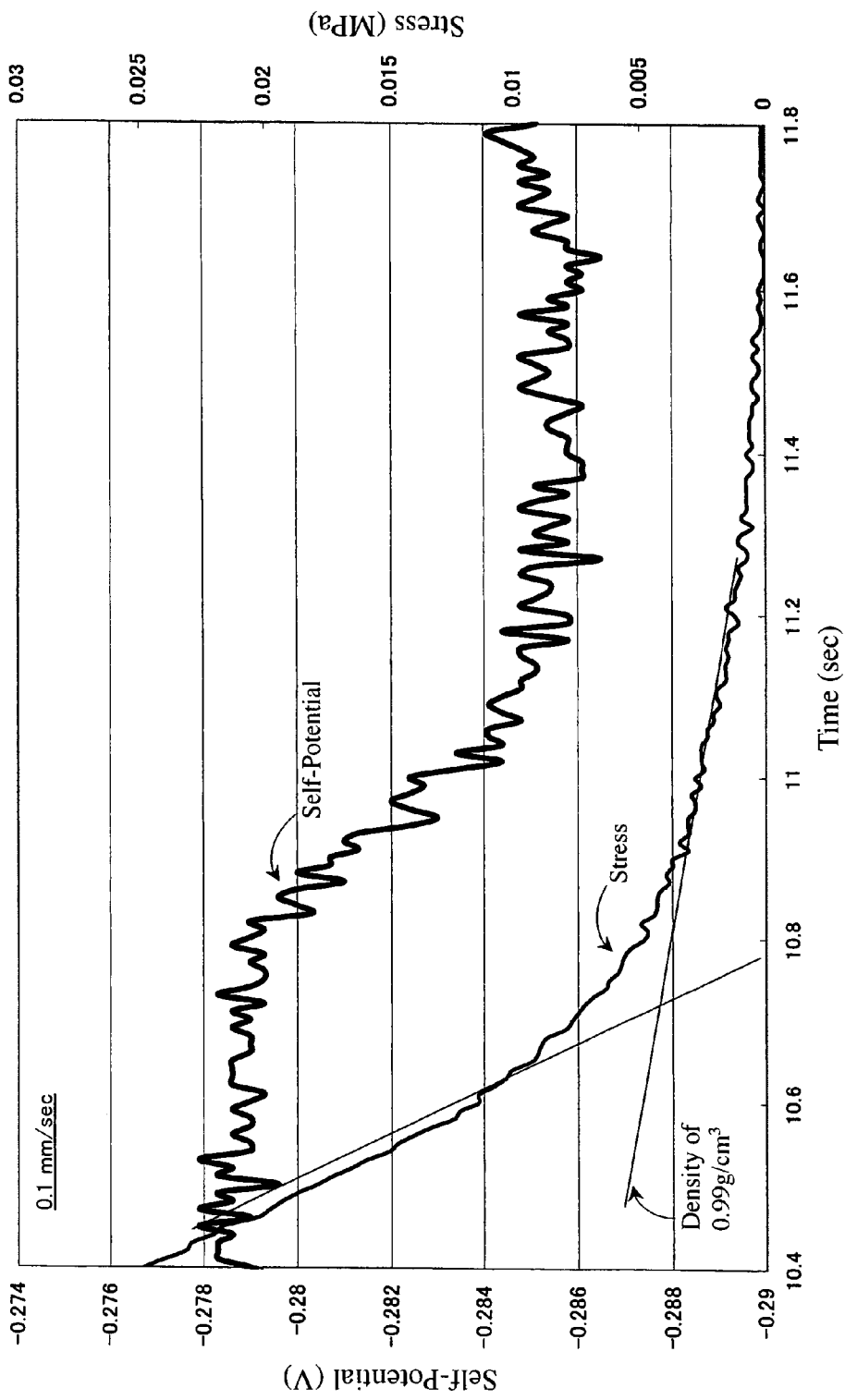
FIG. 13 is a graph showing an electromotive force of the piezoelectric body of Example 1 changing with stress.
Figure 14:
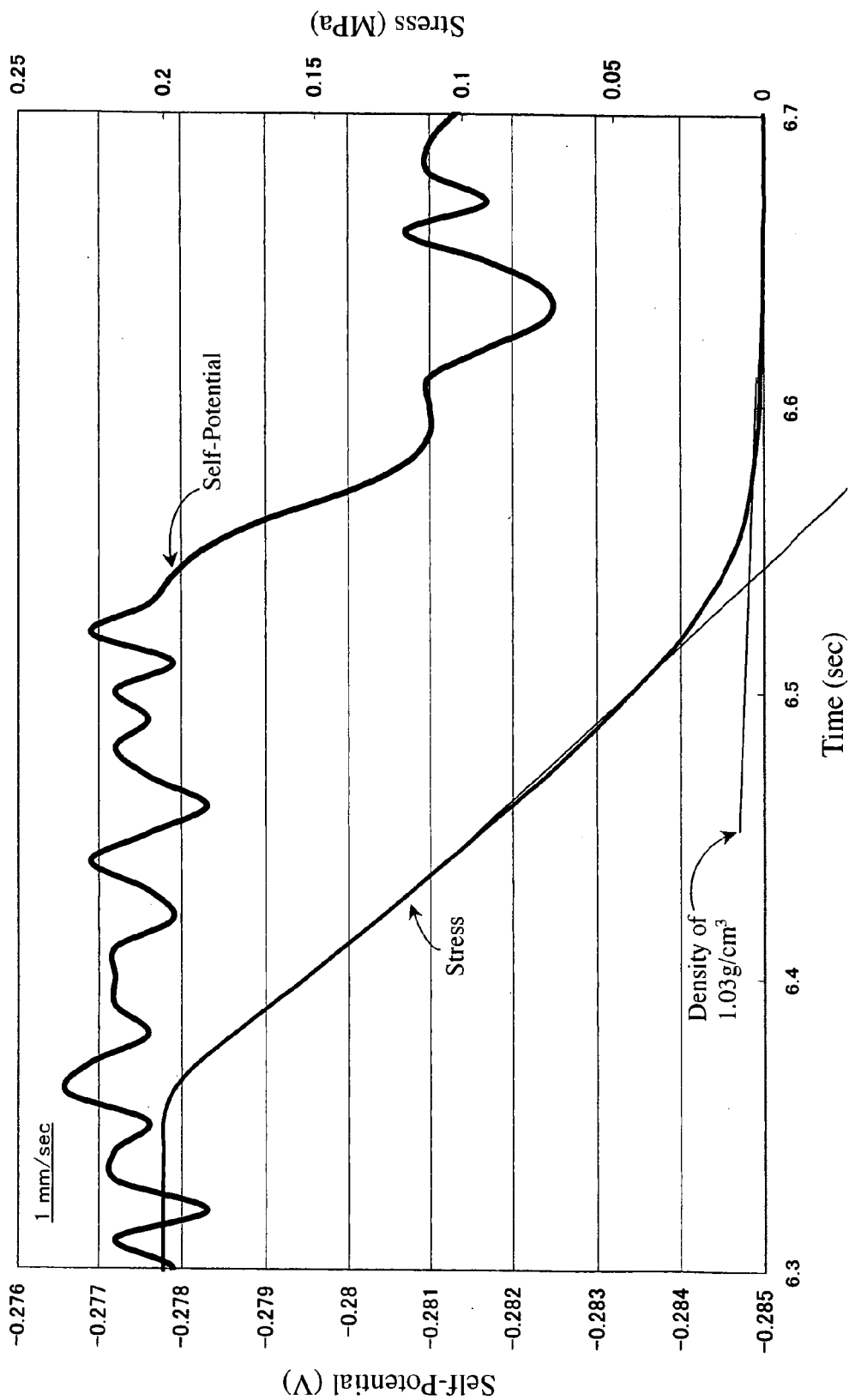
FIG. 14 is a graph showing an electromotive force of the piezoelectric body of Example 1 changing with stress.

The example shown in FIG. 6 is substantially the same as shown in FIGS. 4 and 5, except that pluralities of work electrodes 4 and powder compacts 1 are arranged in tandem in a cell 10. Accordingly, only differences will be explained below. In the example shown in FIG. 6, three work electrodes 4 and three powder compacts 1 are contained in one cell 10, though not restrictive. The numbers of the work electrode 4 and the powder compact 1 in one cell 10 may be 2, or 4 or more, respectively.

The cell 10 contains two sets of a work electrode 4, a powder compact 1, and a planar insulator 70, and another work electrode 4 and another powder compact 1 in this order. Each powder compact 1 has a fixed end 1*a* bonded to each work electrode 4, and a driving end 1*b* bonded to each insulator 70, and each insulator 70 is bonded to the work electrode 4, so that when the powder compacts 1 extend and then contract by the supply of electric current, the powder compacts 1 and the work electrodes 4 returns to their original positions. A movable plate 31 is fixed to a driving end 1*b* of the powder compact 1 on the side of the counter electrode 5. Because the width of the insulator 70 is slightly smaller than the inner width of the cell 10, the insulator 70 is not in contact with the cell 10. Accordingly, there is no friction between the insulator 70 and the cell 10 when the powder compact 1 extends or contracts.

When electric current is supplied between each work electrode 4 and the counter electrode 5, each powder compact 1 absorbs or releases the ion donor 2 to extend or contract, resulting in moving the movable rod 32 fixed to the movable plate 31. Because of plural powder compacts 1 arranged in tandem, this piezoelectric polymer actuator produces large displacement. Because each powder compact 1 is sufficiently thin, it can quickly absorb or release the ion donor 2, resulting in excellent response.

The present invention will be explained in more detail referring to Examples below without intention of restricting the present invention thereto.

EXAMPLE 1

40.55 g of iron trichloride was dissolved in 100 mL of methanol. While stirring the resultant solution at 0° C., 7.20 g of pyrrole was slowly dropped. After stirring at 0° C. for 20 minutes after the completion of dropping, the resultant black precipitate was filtered out, and washed with ethanol and then distilled water to obtain polypyrrole powder. Voltage-resistance measurement revealed that the polypyrrole powder had resistance of 20 Ω

The polypyrrole powder was charged into an IR tablet mold having a diameter of 10 mm, and compressed at a pressure of 748-873 MPa for 5 minutes while evacuating the tablet mold, to form a polypyrrole powder compact. Voltage-resistance measurement revealed that the powder compact had resistance of 0.02 Ω.

This polypyrrole powder compact was soaked in the electrolytic solution, and voltage was applied such that the powder compact acted as a work electrode to reduce the polypyrrole. The conditions of the reduction reaction were as described below.

| | |
|---|---|
| Electrolytic solution: | Aqueous solution of $NaPF_6$ (1 mol/L), |
| Work electrode: | Platinum, |
| Counter electrode: | Platinum wire, |
| Reference electrode: | Silver/Silver chloride, |
| Applied voltage: | −0.8 V, |
| Voltage application time: | 1 hour, and |
| Relaxation time after reduction: | 1.5 hours. |

The resultant powder compact in a reduced state and the aqueous solution of $NaPF_6$ (1 mol/L) were charged into the cell of the apparatus shown in FIG. 3. When a driving means 20 was moved from a position about 1 mm from the rear end of cell 10 toward the load cell 60 at fixed velocities (0.0002 mm/sec., 0.02 mm/sec., 0.1 mm/sec. and 1 mm/sec., respectively), the change of self-potential occurred after stress was applied. The results are shown in FIGS. 7-10, respectively. Stress was increased to 20 MPa, exceeding the level of changing the self-potential. When the driving means 20 was moved away from the load cell at a fixed velocity, the self-potential almost returned to the original one. The results are shown in FIGS. 11-14, respectively.

EXAMPLE 2

Figure 15:
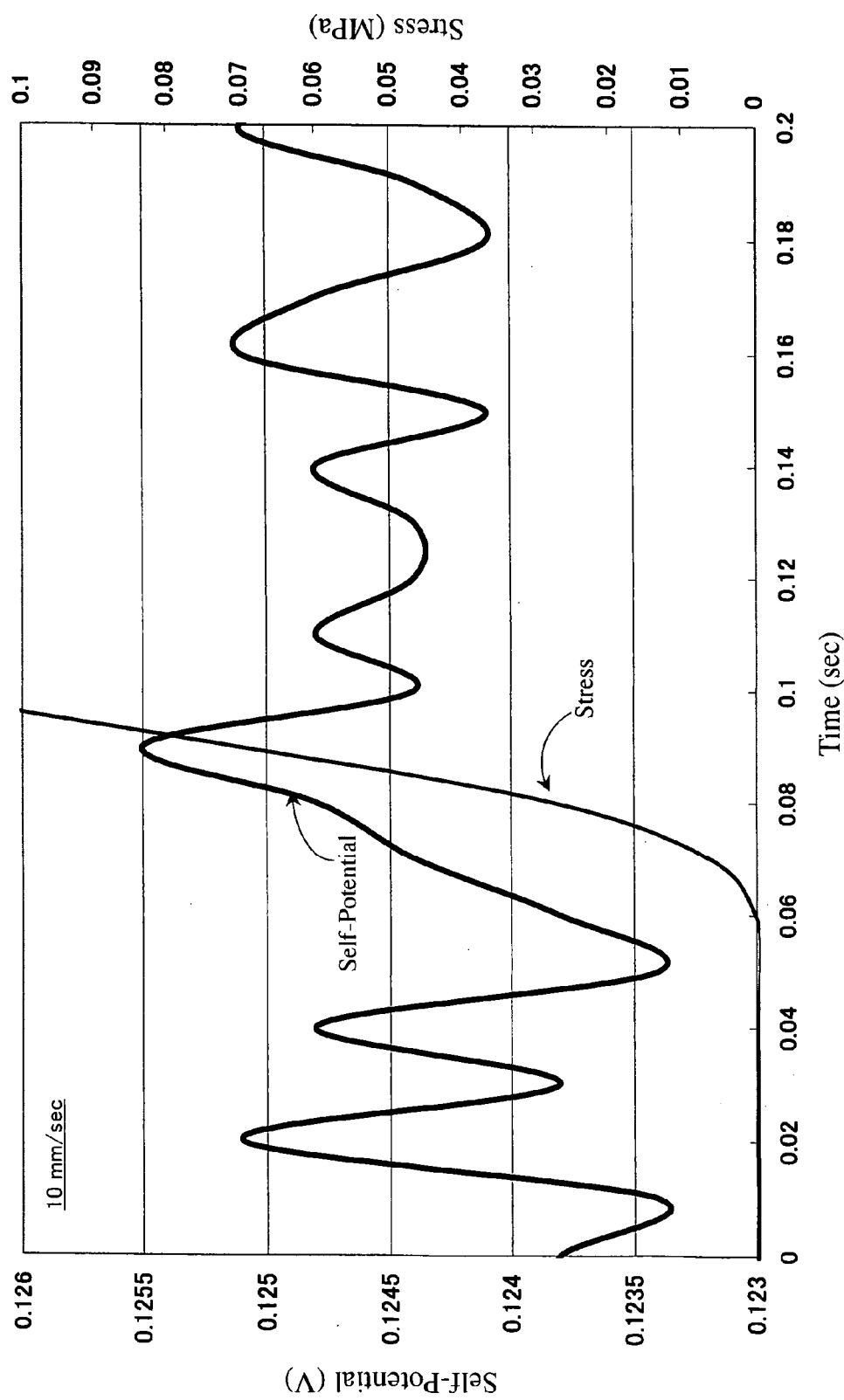
FIG. 15 is a graph showing an electromotive force of the piezoelectric body of Example 2 changing with stress.
Figure 16:
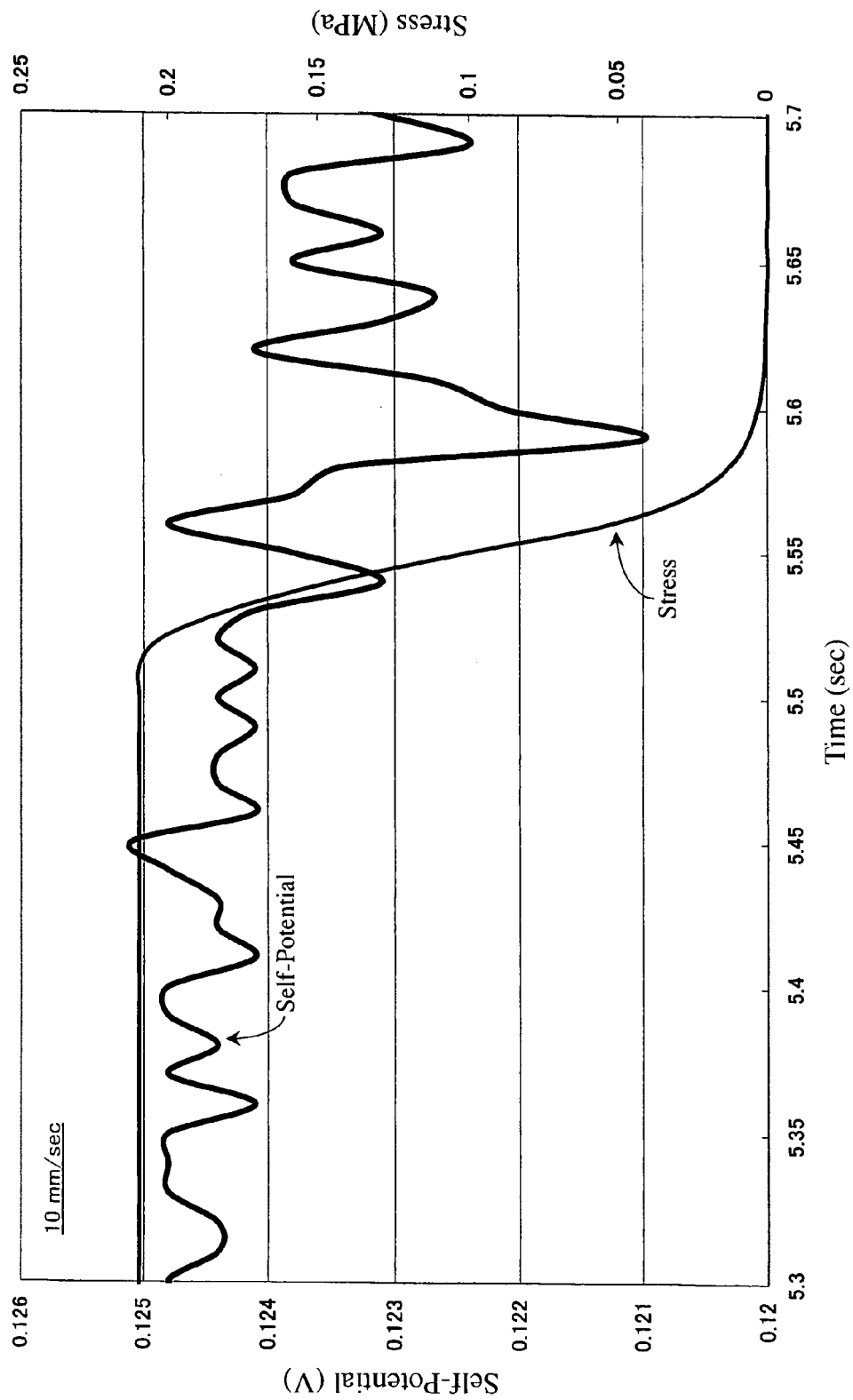
FIG. 16 is a graph showing an electromotive force of the piezoelectric body of Example 2 changing with stress.

The polypyrrole powder compact produced in the same manner as in Example 1 was oxidized under the following conditions. The self-potential was measured in the same manner as in Example 1 except that the polypyrrole powder compact in an oxidized state was charged into the cell, and that the driving means 20 was moved at a velocity of 10 mm/sec. The results are shown in FIGS. 15 and 16.

| | |
|---|---|
| Ion donor: | Aqueous solution of $NaPF_6$ (1 mol/L), |
| Work electrode: | Platinum, |
| Counter electrode | Platinum wire, |
| Reference electrode: | Silver/Silver chloride, |
| Applied voltage: | 0.8 V, |
| Voltage application time: | 1 hour, and |
| Relaxation time after oxidation: | 14 hours. |

EXAMPLE 3

Figure 17:
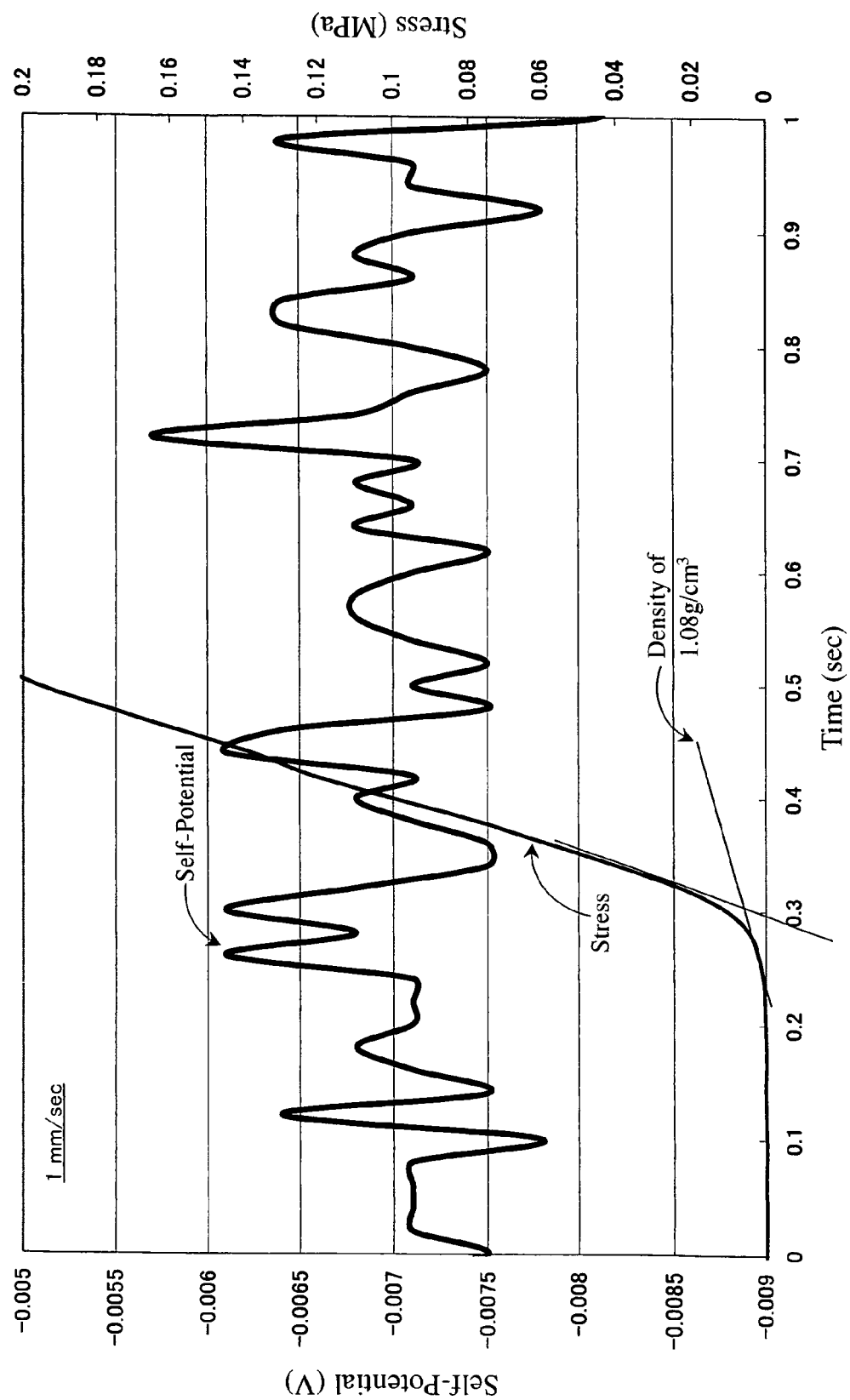
FIG. 17 is a graph showing an electromotive force of the piezoelectric body of Example 3 changing with stress.
Figure 18:
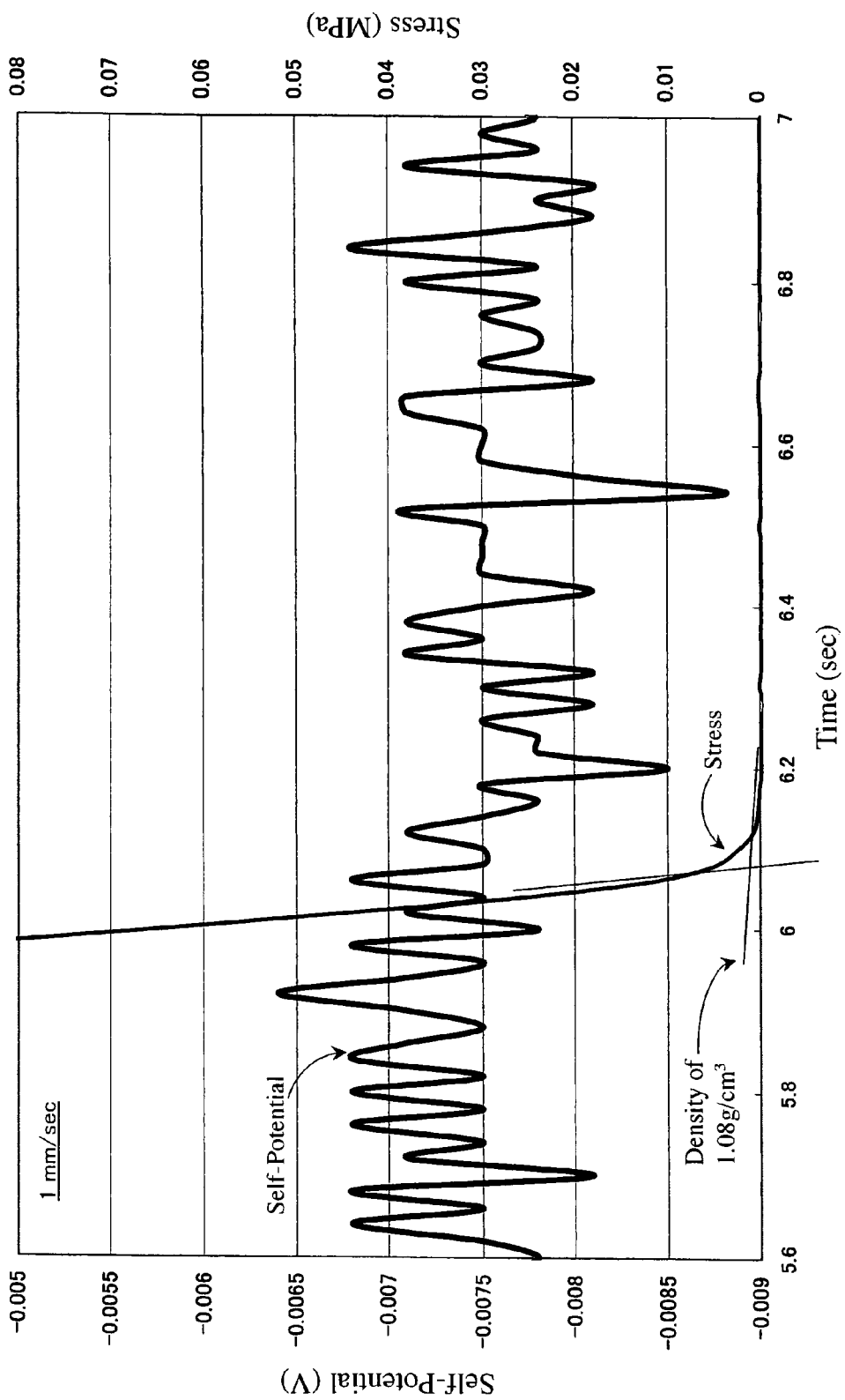
FIG. 18 is a graph showing an electromotive force of the piezoelectric body of Example 3 changing with stress.

The polypyrrole powder compact produced in the same manner as in Example 1 was neutralized under the following conditions. The self-potential was measured in the same manner as in Example 1, except that the polypyrrole powder compact in a neutral state was charged into the cell, and that the driving means 20 was moved at a velocity of 1 mm/sec. The results are shown in FIGS. 17 and 18.

| | |
|---|---|
| Ion donor: | Aqueous solution of $NaPF_6$ (1 mol/L), |
| Work electrode: | Platinum, |
| Counter electrode: | Platinum wire, |
| Reference electrode: | silver/silver chloride, |
| Applied voltage: | 0 V, |
| Voltage application time: | 1 hour, and |
| Relaxation time after oxidation: | 1.5 hours. |

EFFECT OF THE INVENTION

Because the piezoelectric body of the present invention comprises a powder compact comprising conductive polymer powder and a dopant, and an ion donor to generate an electromotive force by stress change, it can be used for electric generators, sensors detecting pressure, displacement and acceleration, etc. Because the conductive powder compact contracts or extends by the application of voltage, it can be used to generate a driving force in a polymer actuator. The polymer actuator of the present invention converts an electric energy to a kinetic energy and vice versa effectively. Thus, a pair of polymer actuators can be used as an apparatus (energy-generating or recovering system), wherein voltage is applied to one polymer actuator to generate a kinetic energy, and the other polymer actuator partially recovers an electric energy from the kinetic energy. Further, the recovered electric energy can be fed back as part of power source, resulting in an intelligent material.

What is claimed is:

1. A polymer actuator comprising a piezoelectric body, a work electrode and a counter electrode,
   wherein said piezoelectric body comprises a conductive powder compact comprising a conductive polymer and a dopant, and an ion donor, whereby an electromotive force is generated by stress change,
   wherein said work electrode is in contact with said powder compact,
   wherein said counter electrode is disposed at a position separate from said powder compact is said ion donor, whereby said powder compact contracts or extends when voltage is applied between said work electrode and said counter electrode,
   wherein said polymer actuator further comprises plural powder compacts arranged in tandem in said ion donor.

2. The piezoelectric body according to claim 1, wherein said conductive polymer has a conjugated structure.

3. The piezoelectric body according to claim 2, wherein said conductive polymer is at least one selected from the group consisting of polypyrrole, polythiophene, polyaniline, polyacetylene and their derivatives.

4. The piezoelectric body according to claim 1, wherein said ion donor is in the form of a solution, a sol, a gel or a combination thereof.

5. The piezoelectric body according to claim 4, wherein said ion donor functions as a binder.

6. The piezoelectric body according to claim 4, wherein said ion donor contains an amphiphatic compound.

7. The piezoelectric body according to claim 1, wherein the amount of said conductive polymer in said conductive powder is 1-99.9% by mass.

8. The piezoelectric body according to claim 1, wherein said conductive powder has electric resistance of $10^{-7}$ Ω to 1 MΩ.

9. The piezoelectric body according to claim 1, wherein said conductive polymer has an average particle size of 10 nm to 1 mm.

10. An electric generator comprising the piezoelectric body recited in claim 1, and a means for changing stress applied to said powder compact, wherein said ion donor is released from and/or absorbed by said powder compact by compressing and/or extending said powder compact with said stress-changing means so as to generate said electromotive force.

11. An energy-generating/recovering system comprising at least a pair of the polymer actuators recited in claim 1, wherein the contraction or extension of one powder compact is transmitted to the other powder compact to change its stress, so that the other powder compact generates an electromotive force.

\* \* \* \* \*